US012735004B1

(12) United States Patent
Bailey

(10) Patent No.: US 12,735,004 B1
(45) Date of Patent: Sep. 15, 2026

(54) CABLE ACTUATED TOW BRAKE SYSTEM

(71) Applicant: David F. Bailey, Riverview, FL (US)

(72) Inventor: David F. Bailey, Riverview, FL (US)

( * ) Notice: Subject to any disclaimer, the term of this patent is extended or adjusted under 35 U.S.C. 154(b) by 277 days.

(21) Appl. No.: 18/831,042

(22) Filed: May 14, 2024

Related U.S. Application Data

(63) Continuation of application No. 17/300,142, filed on Mar. 22, 2021, now abandoned.

(60) Provisional application No. 63/100,665, filed on Mar. 23, 2020.

(51) Int. Cl.
*B60T 7/20* (2006.01)
*B60T 7/16* (2006.01)
*B60T 8/32* (2006.01)
*F16H 19/06* (2006.01)

(52) U.S. Cl.
CPC .................. *B60T 7/20* (2013.01); *B60T 7/16* (2013.01); *B60T 8/3275* (2013.01); *F16H 19/06* (2013.01); *F16H 2019/0695* (2013.01)

(58) Field of Classification Search
CPC ............ B60T 7/20; B60T 7/16; B60T 8/3275; B60T 7/042; B60T 7/04; B60T 17/08; F16H 19/06; F16H 2019/0695; B60W 10/18
See application file for complete search history.

(56) References Cited

U.S. PATENT DOCUMENTS

| | | | | |
|---|---|---|---|---|
| 5,503,468 | A * | 4/1996 | Saffran | B60T 13/66 303/7 |
| 5,626,402 | A * | 5/1997 | Saffran | B60T 7/20 303/7 |
| 6,050,649 | A * | 4/2000 | Hensley | B60T 7/042 303/3 |
| 6,626,504 | B2 * | 9/2003 | Harner | B60T 7/20 303/7 |
| 6,926,125 | B1 * | 8/2005 | Westervelt | B60T 7/20 280/446.1 |
| 9,315,173 | B1 * | 4/2016 | Gray | B60T 7/042 |
| 10,077,034 | B2 * | 9/2018 | Sanders | B60T 8/171 |
| 10,421,441 | B2 * | 9/2019 | Sanders | B60T 13/662 |
| 10,604,125 | B2 * | 3/2020 | Graham | B60T 7/20 |
| 11,338,778 | B2 * | 5/2022 | Lin | B60T 13/745 |
| 11,447,108 | B1 * | 9/2022 | Bailey | B60T 8/172 |
| 2002/0030405 | A1 * | 3/2002 | Harner | B60T 13/686 303/123 |
| 2013/0238205 | A1 * | 9/2013 | Edwards | B60T 17/02 74/108 |
| 2018/0126967 | A1 * | 5/2018 | Sanders | B60T 8/323 |
| 2018/0148019 | A1 * | 5/2018 | Graham | B60T 7/107 |
| 2019/0016314 | A1 * | 1/2019 | Sanders | B60T 13/662 |
| 2022/0297642 | A1 * | 9/2022 | Fleck | B60T 7/12 |

* cited by examiner

*Primary Examiner* — Thomas W Irvin

(57) ABSTRACT

A cable actuated tow brake system to remotely monitor and control the braking of a towed vehicle comprising a actuator cable secured to a pulley wherein the actuator cable is coupled between a pulley drive motor and the brake pedal assembly of the towed vehicle to selectively displace the brake pedal of the towed vehicle to apply the brakes of the towed vehicle proportionally to the towing vehicle when the brakes of the towing vehicle are applied.

26 Claims, 20 Drawing Sheets

52
44
30
54
46
24
80
78
76
84
46
46
48
48
82
60
80
84
76
86
34
86
20
68
38
48
48
40
70
46
46
52
46
54
44

30
24
66
62
60
60
66
44
36
58
64
20
34
40
44

106

TOW BRAKE STATE DIAGRAM

CABLE ACTUATED TOW BRAKE SYSTEM

CROSS-REFERENCE

This utility application claims priority of utility application Ser. No. 17/300,142 filed Mar. 22, 2022 that claims priority of provisional application No. 63/100,665 filed Mar. 23, 2020.

BACKGROUND OF THE INVENTION

Field of the Invention

A tow brake system to remotely control and monitor the braking of a towed vehicle.

Description of the Prior Art

Often recreational vehicles, motor homes, trucks, and the like tow a smaller vehicle hitched thereto. The combined weight of the towing vehicle and towed vehicle creates a dangerous braking condition when using only the towed vehicle brake system.

This increased mass impacts both the stopping distances and time, as well as creates excessive wear on the brakes of the towing vehicle. Further, the mechanical connection between the towing vehicle and the towed vehicle is overly stressed.

Furthermore, ABS systems present a contamination problem when being towed. These ABS systems are rendered inoperative when the fluid level decreases. As such, these ABS brake systems can cause faults in their computer programs and operation of the brake and traction systems.

The prior art has sought to remedy this problem. In one such remedy, each time a vehicle is to be towed, a device is inserted into that vehicle to operate its braking system, or to substitute for its braking system. The device is then connected to the braking system of the towing vehicle through hydraulic, high pressure air, or vacuum lines. Though more effective than having no contribution to overall braking from the towed vehicle, these remedies rarely approach the ideal, in which no additional load is placed on the towing vehicle's brakes. Further, in order to independently operate the towed vehicle, the installed braking device must be removed, as well as the hydraulic, air or vacuum lines. The inconvenience of repeatedly installing and removing braking devices and cumbersome lines has limited the acceptance of these types of prior art systems. Additionally, the required connection and disconnection may result in air or other contamination of the closed brake systems, rendering them inoperative.

U.S. Pat. No. 6,626,504 discloses a brake actuation system for towed vehicles for automated operation of the brakes of a towed vehicle comprising a power-actuated tension member such as a cable attached to the towed vehicle brake pedal to pull the brake pedal downward to apply the vehicle brakes in controlled response to commands from a controller mountable at a remote location such as on a towing vehicle.

U.S. Pat. No. 3,318,422 shows a tow bar controlled brake actuating device for towed vehicles comprising a tow bar having an outer tubular member and an inner stem member movable therein including a wire having a flexible sheath member and a cable member slidable therein. A first fastening means connects one end of the cable member to the brake pedal of the towed vehicle and a second fastening means attaches the other end of the cable member to the tow bar. A first stop member is adapted to stop the relative movement of one end of the sheath member relative to the outer tubular member. A second stop member is adapted to prevent relative movement of the other end of the sheath member with respect to the frame to pull the cable member and to actuate the brake when relative movement occurs between the outer tubular member and the stem member.

U.S. Pat. No. 5,503,468 relates to a towed vehicle braking system including a drive motor connected by a cable to a brake pedal lever in the towed vehicle to apply the brakes of the towed vehicle proportionally to the towing vehicle brakes.

U.S. Pat. No. 6,609,766 shows a progressive and proportional braking system for use with a towed vehicle. Utilizing the towed vehicle's existing vacuum power assisted braking system.

U.S. Pat. No. 8,430,458 discloses an auxiliary braking system located in a towed vehicle for braking the towed vehicle including a remote control to selectively communicate with an auxiliary braking unit in a towing vehicle. The auxiliary braking system allows the operator of the towing vehicle to assess the functioning of the auxiliary braking unit. In addition, the operator is able to remotely effect real time adjustments to the performance parameters of the auxiliary braking system while driving.

US 2006/0071549 relates to an electronic controlled vacuum powered brake system for a towed vehicle such as a boat, horse, travel, fifth wheel and utility trailers. Comprising a vacuum power assisted master cylinder with two outlet ports of hydraulic power, a vacuum pump, a solenoid, an electronic power module, and a dash control module. The power brake unit is directly connected by lever arm to the solenoid of the towed vehicle.

U.S. Pat. No. 6,609,766 describes a braking system for a towing vehicle and a towed vehicle wherein the towing vehicle's brake system sends an electronic relay to the towed vehicle's brake system to apply the brakes of the towed vehicle at the proper rate of deceleration.

US 2004/0160117 shows an auxiliary braking apparatus configured for use with a towed vehicle. Configuring a solid state inertia device to sense changes in inertia attributable to the braking of the towing vehicle. The auxiliary braking apparatus includes a reservoir constructed from a two step injection molding process thereby lowering overall manufacturing costs of the braking apparatus as well as improving the ability of the reservoir to be directly mounted to the housing of the braking apparatus.

U.S. Pat. No. 6,126,246 relates to towed vehicle braking systems including a compressor to drive a fluid actuator with a piston attached to the towed vehicle's brake actuator, e.g., a brake pedal or hand grip. The braking system is actuated by either a towed vehicle velocity decrease sensor, a separation of the towed vehicle and the towing vehicle sensor and/or coded signals from a radio transmitter operated by the driver of the towing vehicle to control the braking system of the towed vehicle.

U.S. Pat. No. 6,631,636 shows a device for testing the hydraulic brake system of motor vehicles for the presence of small and extremely small leaks comprising a loading rod including a non-rotating extendable spindle and measuring head.

While some of the prior art may contain some similarities relating to the present invention, none of them teach, suggested or include all of the advantages and unique features of the invention disclosed hereafter.

SUMMARY OF THE INVENTION

The present invention relates to a cable actuated tow brake system to control the braking of a towed vehicle when the towing vehicle is braking.

A system comprising a number of unique features including an anti-jam cable structure and sensor cabled management system with an encoder and current sensing to ensure pull cable is not bound up. The encoder and current sensor data is processed to provide jam fault detection and management. Rotation of encoder is directly mechanically coupled to a motor drive assembly and a cable pulley motor to maintain rotation accuracy. A pulley block is configured to eliminate cable tangle. In particular, the size and depth of pulley and cavity of pulley block constrains movement of the cable into controlled spooling and unspooling operation.

A force sensor provides proportional braking to acceleration MEMs sensor. Brake force sensor method using "floating motor" to detect and measure brake pedal forces.

The multilevel brake event detection and qualification architecture, qualifies braking event with left and right turn and brake lights and timing, qualifies braking event with acceleration detection from MEMS and employs towing vehicle brake light signal in addition to acceleration detection from MEMS to invoke a braking sequence.

Break-away operation is performed to detect and operate the towed vehicle brakes when separation of towing vehicle to towed vehicle is detected using a combination of towed vehicle battery and supercapacitor backed up power sources.

Additional features include:

- energy harvesting/charging from the towing vehicle,
- supercapacitor power backed up to operate tow brake system upon loss of towed vehicle power,
- break-away detection using charge line to detect,
- braking sequence hold motor torque foldback to save power and reduce heat during extended braking operation,
- auto tow mode detection circuitry,
- automatically performs supplemental braking when towed vehicle is attached to towing vehicle and not perform braking and be in low power mode when vehicles are not connected, and
- detecting "in tow" operation to automatically functional when the towed vehicle is in tow behind a towing vehicle using charge line detection to determine mode of operation.

This summary is not intended to describe essential features of the claimed subject matter nor is it intended to limit the scope of the claimed subject matter. To the contrary, this summary merely outlines various concepts and features that are developed in the detailed description.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE INVENTION

Figure 1:
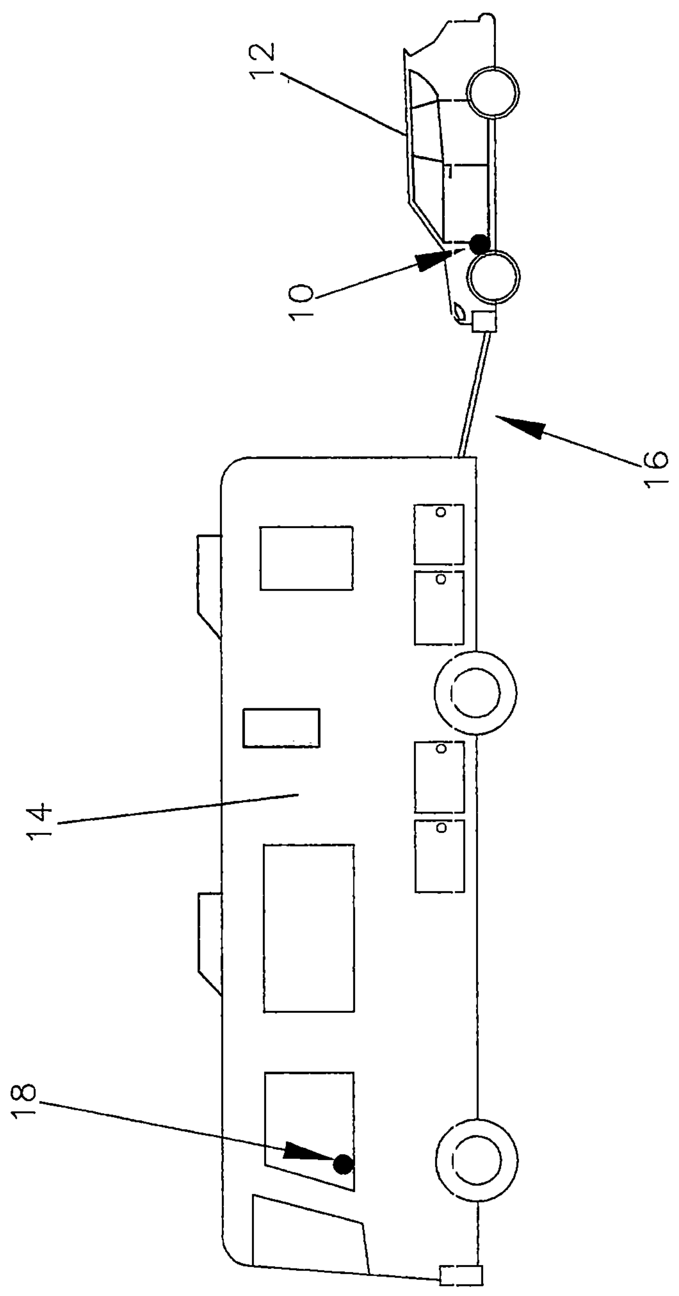
FIG. 1 is a side view of a towing vehicle including remote control and monitoring and towed vehicle including the tow brake system remote control of the present invention.

As shown in FIG. 1, the present invention relates to a cable actuated tow brake system generally indicated as 10 mounted in a towed vehicle 12 and coupled to the RV brake light signal of a towing RV or other towing vehicle 14 by a connector harness generally indicated as 16. A control and display console generally indicated as 18 is disposed within the RV or towing vehicle 14 to provide two-way remote communications between the towed vehicle 12 and RV or towing vehicle 14 to transfer command signals and operational status signals therebetween.

Figure 2:
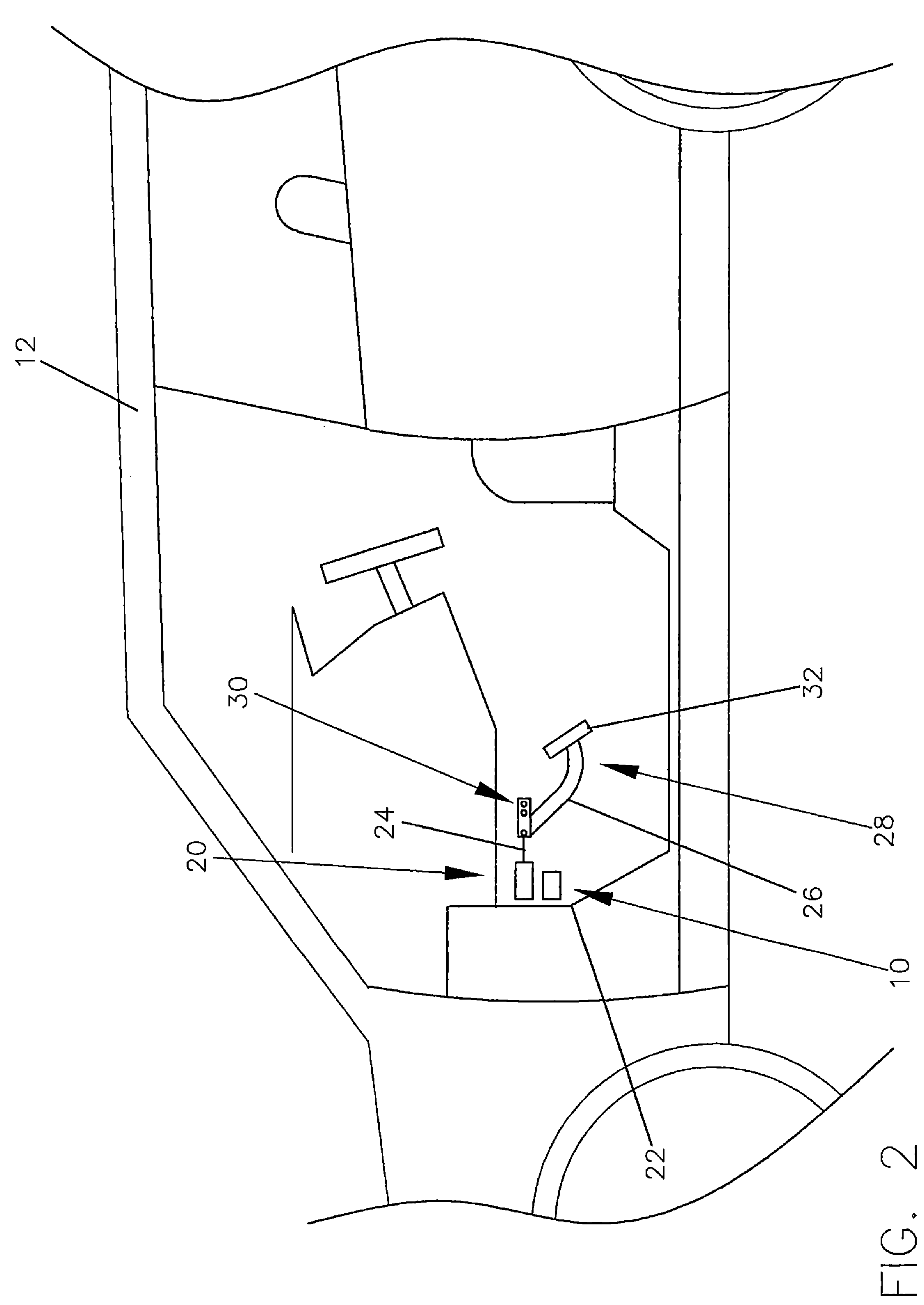
FIG. 2 is a partial side view of the towed vehicle with the tow brake system of the present invention installed.

As shown in FIG. 2, the cable actuated tow brake system 10 comprises a brake control assembly generally indicated as 20 affixed to the firewall 22 of the towed vehicle 12 and an actuator cable 24 operatively coupled between the brake control assembly 20 and the pivotal brake pedal arm 26 of the brake pedal assembly generally indicated as 28 by a brake pedal assembly connector generally indicated as 30. A brake pedal 32 is affixed to the proximal end of the pivotal brake pedal arm 26.

As shown in FIGS. 3 through 9, the brake control assembly 20 comprises an enclosure generally indicated as 34 including a front wall 36, rear wall 38, top wall 40 and bottom wall 42 secured to the firewall 22 by a mounting bracket generally indicated as 44 including inner or inside wall 45 disposed at each end of the enclosure 34 to house the mechanical mechanisms, electronics, circuitry, logic and controls described hereinafter. The mounting brackets 44 are secured to the enclosure 34 by a plurality of fasteners each indicated as 46 extending through corresponding slots or holes each indicated as 48 formed in a front flange 50 and a top flange 52 extending inwardly from the corresponding mounting bracket 44 and into corresponding threaded holes (not shown) formed in the front wall 36 and top wall 40. The enclosure 40 is secured to the firewall 22 of the towed vehicle 12 by a mounting flange 54 extending outwardly from the rear portion of each mounting flange 44 by a plurality of fasteners (not shown) extending through corresponding slots or holes each indicated as 56 and into the firewall 22.

Figure 3:
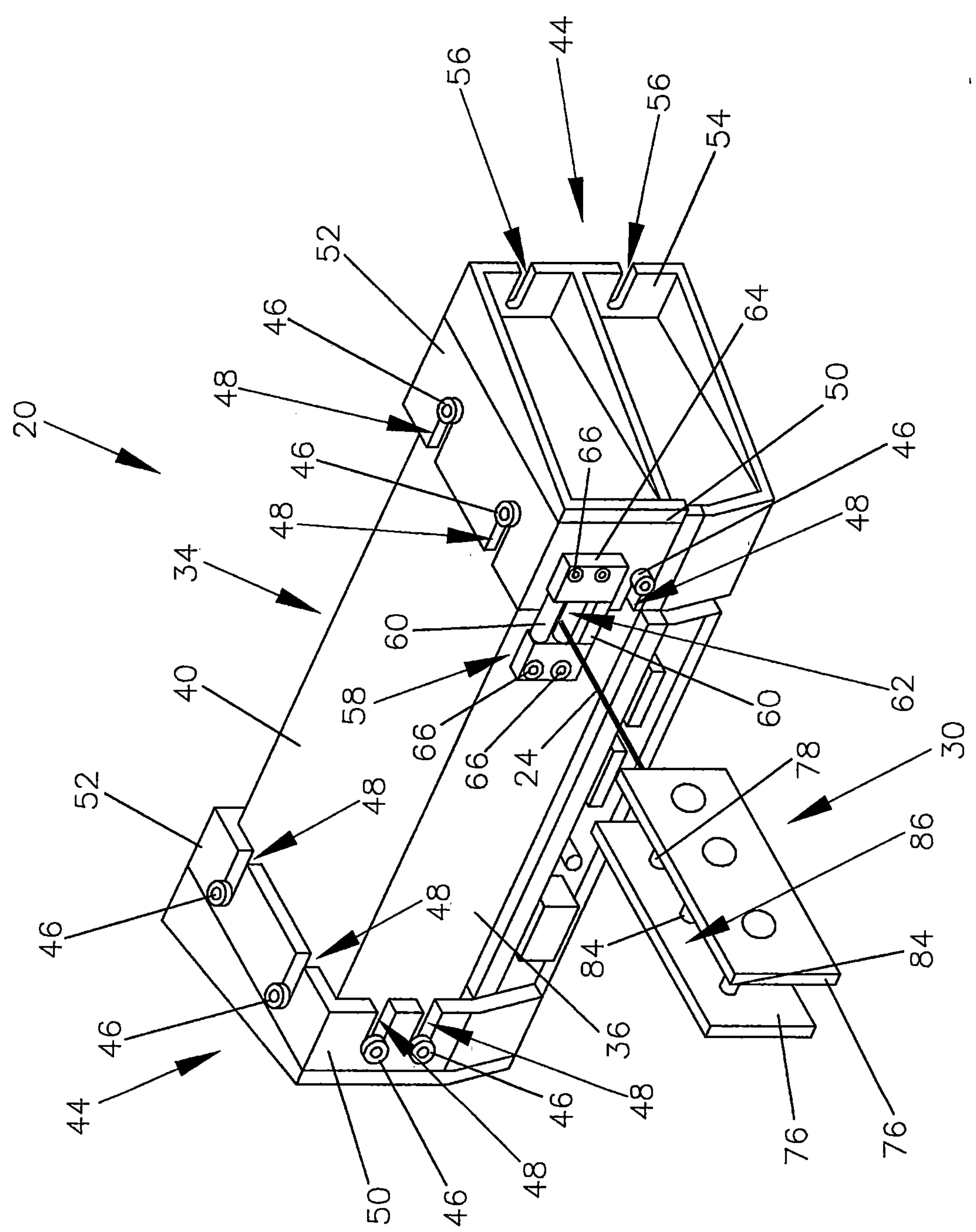
FIG. 3 is a perspective view of the tow brake system of the present invention.
Figure 4:
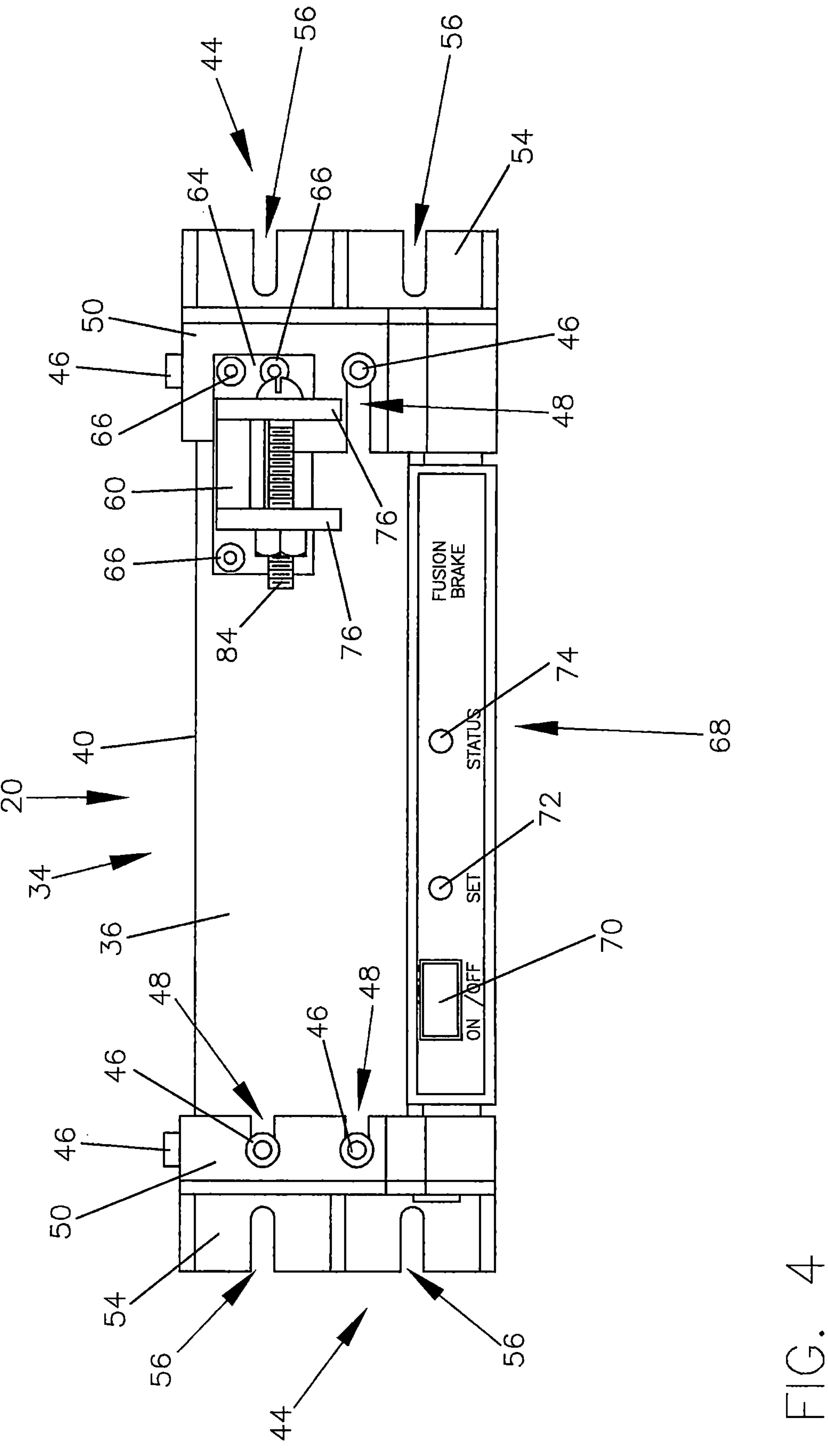
FIG. 4 is a front view of the tow brake system of the present invention.
Figure 8:
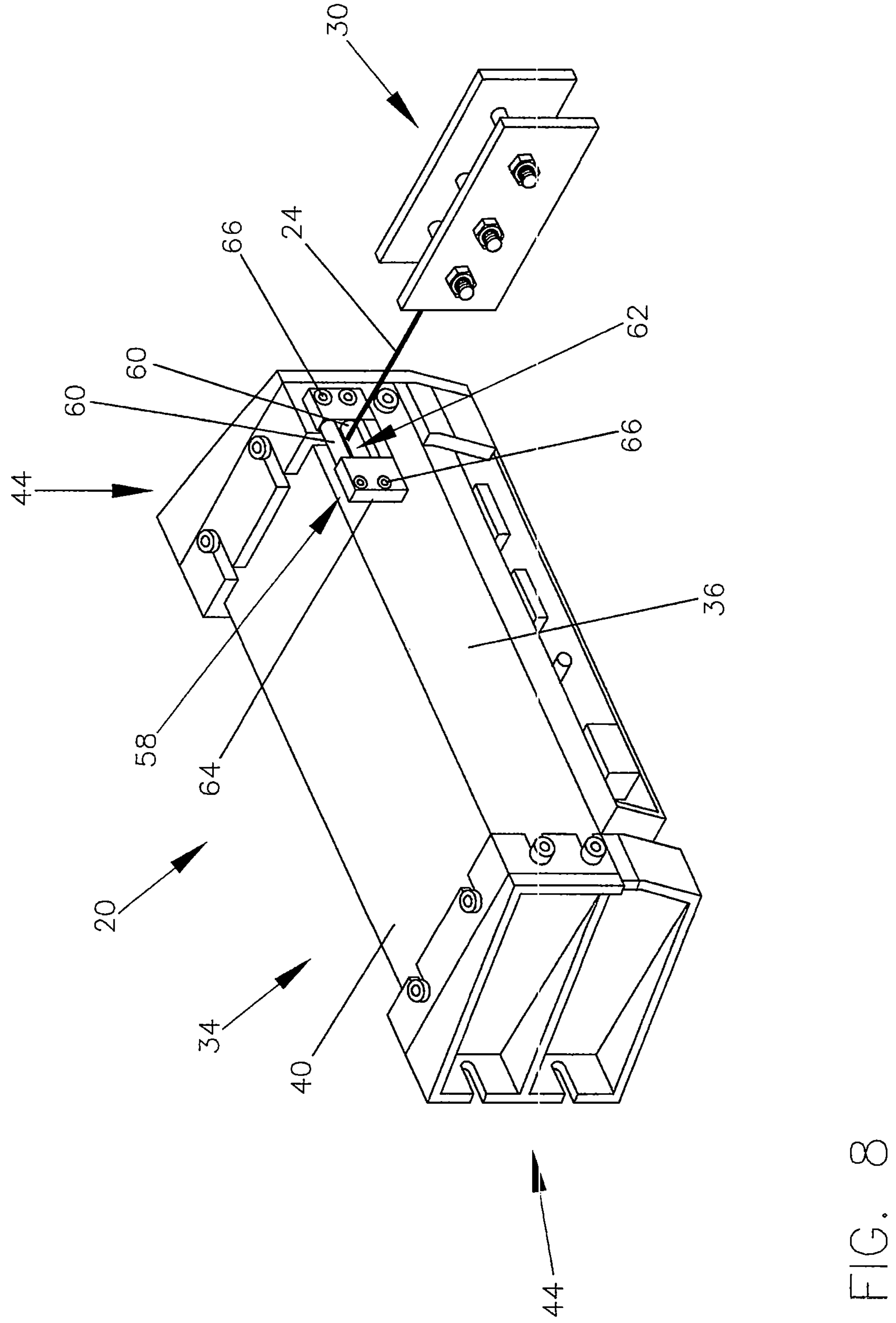
FIG. 8 is a perspective view of the sheathed cable pull assembly of the tow brake system of the present invention.

As best shown in FIGS. 3, 4, and 8, a cable guide generally indicated as 58 including a cable opening (not shown) formed in the front wall 36 of the enclosure 34 having a pair of substantially parallel substantially horizontally disposed rollers each indicated as 60 forming a slot or opening 62 therebetween to receive the actuator cable 24 therethrough. The rollers 60 are rotatably mounted to the front wall 36 of the enclosure 34 by a substantially u-shaped mounting bracket 64 secured to the front wall 36 of the enclosure 34 by a plurality of fasteners each indicated as 66.

As best shown in FIG. 4, a control and display panel generally indicated as 68 including an on/off switch 70, set up switch 72 and status indicator light 74 is disposed on the lower portion of the front wall 36 of the enclosure 34.

Figure 5:
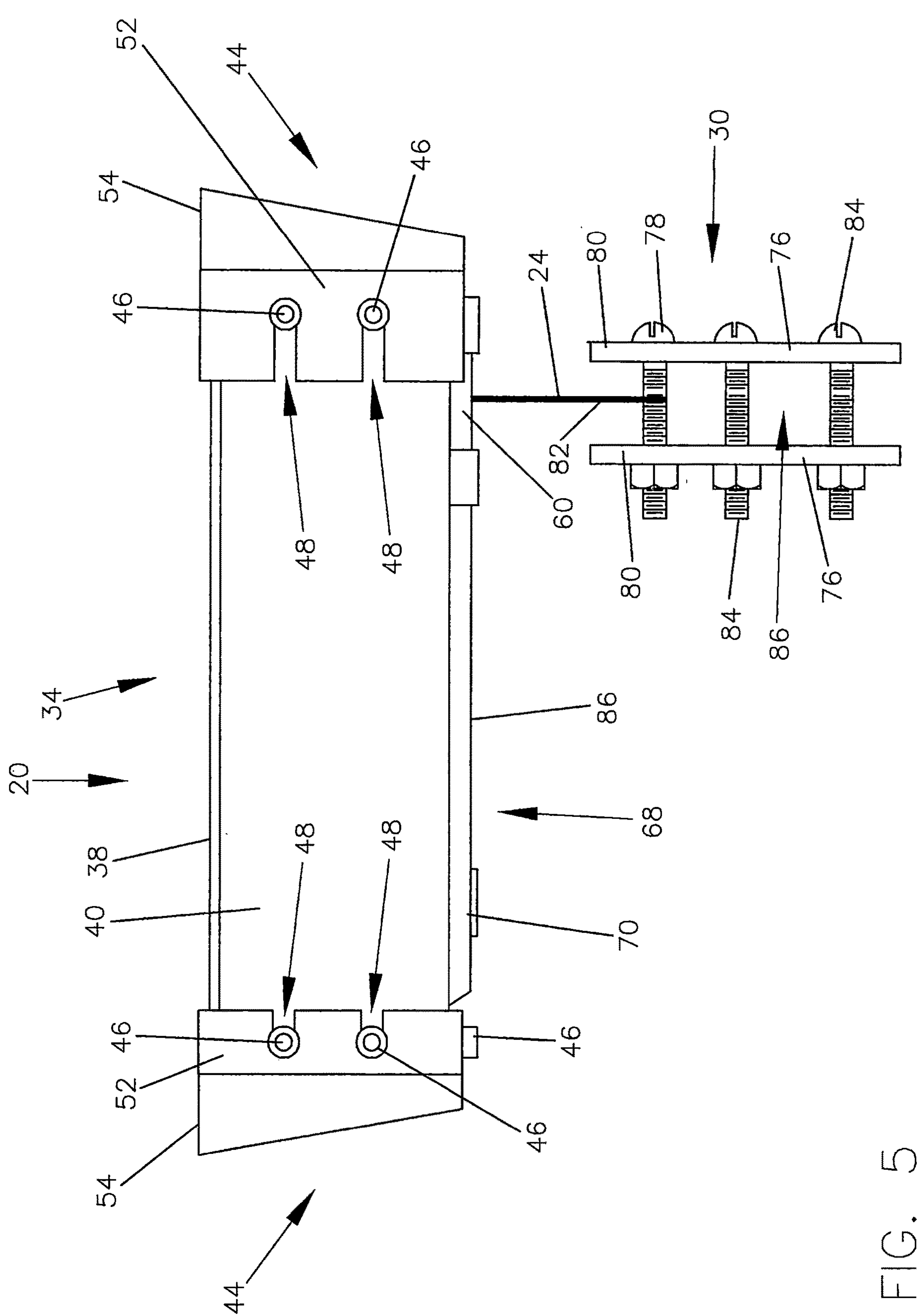
FIG. 5 is a top view of the tow brake system of the present invention.

As best shown in FIGS. 3 and 5, the brake pedal assembly connector 30 comprises a pair of substantially parallel plates or members each indicated as 76 disposed in spaced relationship to each other having a proximal attachment member 78 extending between the proximal end portion 80 of the substantially parallel plates or members 76 to attach the distal end portion 82 of the actuator cable 24 to the brake pedal assembly connector 30. A pair of substantially parallel brake pedal arm connector members each indicated as 84 disposed in spaced relationship relative to each other extend between the substantially parallel plates or members 76 to cooperatively form an opening 86 therebetween to retain the brake pedal arm 26 of the brake pedal assembly 28 therein to couple the actuator cable 24 to the brake pedal assembly 28.

Figure 6:
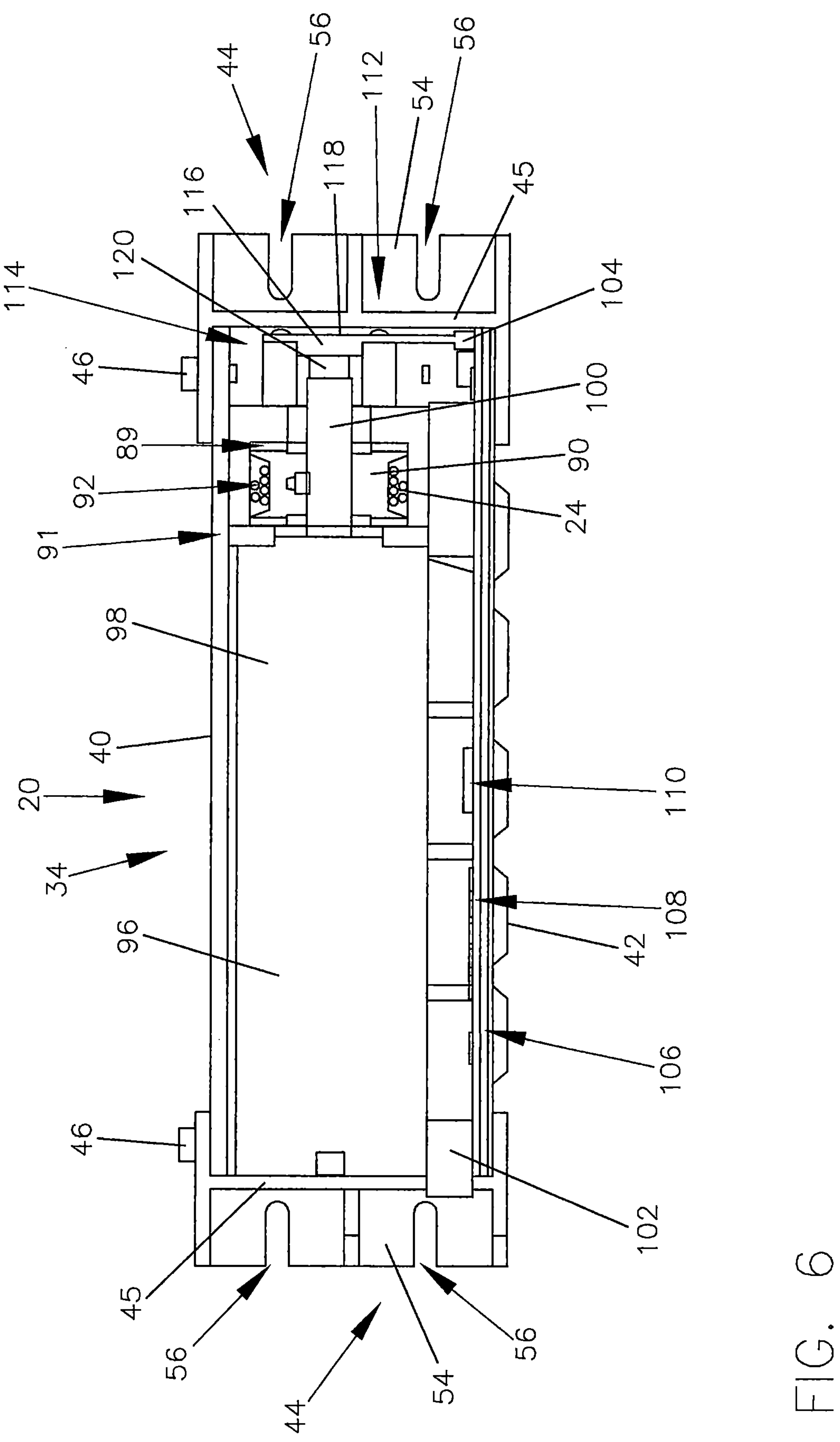
FIG. 6 is a cross-sectional front view of the tow brake system of the present invention.
Figure 7:
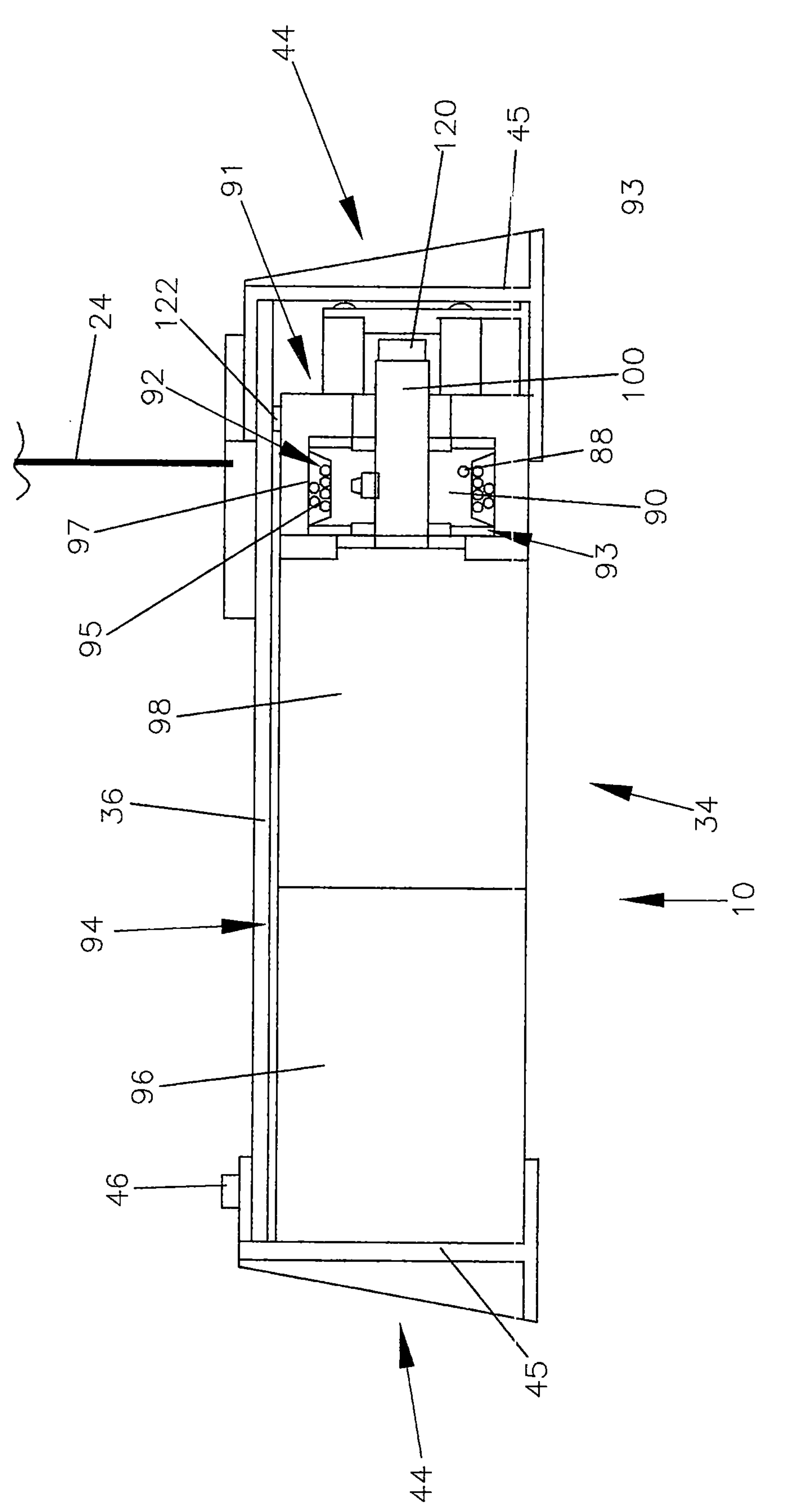
FIG. 7 is a cross-sectional top view of the tow brake system of the present invention.

As shown in FIGS. 6 and 7, the proximal end 88 of the actuator cable 24 is secured to a spool or pulley 90 disposed within a pulley block cavity 89 formed in a pulley block generally indicted as 91.

As shown in FIGS. 6 and 7, a groove 92 is formed in the circumference of the spool or pulley 90 to receive the proximal portion of the actuator cable 24. The depth of groove 92 is preferably equal to or less than twice the diameter of the actuator cable 24 to prevent crossover cable binding of the actuator cable 24.

Of course, the depth of the groove 92 may be increased to at least two and one half (2½) times the cable diameter to accommodate actuator cables 24 of greater lengths.

As shown in FIG. 7, the distance or clearance 93 between the circumference 95 of the spool or pulley 90 and the diameter 97 of the pulley block cavity 89 is less than two diameters of the actual cable 24 to prevent the actuator cable 24 from slipping out of groove 92.

As shown in FIGS. 6 and 7, a drive assembly generally indicated as 94 is coupled to the spool or pulley 90 to selectively rotate the spool or pulley 90 to increase or decrease the tension between the actuator cable 24 and brake pedal assembly 28 to control braking of the towed vehicle 12. The drive assembly 94 comprises a reversible drive motor 96, gear box 98 and output shaft 100 to either wind the actuator cable 24 onto the spool or pulley 90 to move the brake pedal assembly 28 toward the firewall 22 of the tow vehicle 22 to actuate the tow vehicle 22 brakes or to unwind the actuator cable 24 on the spool or pulley 90 to release the brakes of the towed vehicle 10. Drive assembly 94 is floating and captured by inner or side walls 45 of mounting bracket 44 allowing the drive assembly 94 to exert essentially the same force magnitude as applied to the brake pedal arm 26 to the brake assembly front wall 36 through force sensor 122. A polymer spring material surrounds force sensor 122 to prevent loading of force sensor 122 when braking unit 20 is not actuated.

As shown in FIG. 6, an electrical hook-up connector and FPC connector 104 are disposed at opposite ends of the enclosure 34. Also disposed within the enclosure 34 adjacent the bottom wall 42 is a circuit board generally indicated as 106, a power source generally indicated as 108 such as super capacitor and a microcontroller including logic to monitor and control the operational status of the cable actuating tow brake system 10 and the towed vehicle 10 braking generally indicated as 110.

As shown in FIGS. 6 and 7, a brake pedal position sensor generally indicated as 112 is disposed adjacent the outer end portion of the output shaft 100 to measure or sense the rotational position of the pulley or spool 90 relatively to the non-braking position when there is no tension on the actuator cable 24 and the brake pedal assembly 28 is at rest and to generate a corresponding signal as an indication of the amount of actuator cable 24 is taken-up on the pulley or spool 90 that is fed to the microcontroller 110. The microcontroller 110 includes logic to correlate the amount of actuator cable 24 on the pulley or spool 90 derived from the brake pedal assembly position sensor 112 to the position of the brake pedal assembly 28 to determine the braking status of the brakes of the towed vehicle 10. The brake pedal assembly position sensor 112 comprises an encoder mount 114 secured to the pulley mount 91 to support an encoder assembly including an encoder 116 and encoder printed circuit board 118 that in combination with a magnet 120 mounted to the output shaft 100 generates the signal corresponding to the angle of output shaft 100 relative to the position of the encoder 116 and flexible encoder printed circuit board 118 when the pulley or spool 90 is in position that the tension of the actuator cable 24 is not actuating the brakes of the towed vehicle 10. Encoder 116 is disposed coaxially relative to the motor output shaft 100 and magnet 120 to sense or measure the position or angle of the motor output shaft 100 angle relative to the flexible encoder printed circuit board 118.

As shown in FIGS. 6 and 7, the pulley mount 91, the drive assembly 94 and the brake pedal assembly position sensor 112 are movable disposed within the enclosure 34 to engage a force sensor 122 mounted to the inside surface of the front wall 36 of the enclosure 34 adjacent the cable opening (not shown) formed through the front wall 36. The force sensor 122 generates a signal proportionally to the force applied to the brake pedal assembly 28 by the actuator cable 24. Of course, the force sensor 122 may be mounted on the pulley mount 91 to selectively engage the inside surface of the front wall 38. Force sensor 122 and MEMS acceleration sensor located on PCB 106 provide signals for microcontroller 200 to generate proportional brake signals to brake towed vehicle 12 of acceleration generated by towing RV or other towing vehicle 14. Microcontroller 200 processes the angle signals from brake pedal assembly position sensor 112, force sensor 122 and motor driver 202 current to detect any binding of actuator cable 24. Actuator cable 24 faults due to binding of the actuator cable 24 are prevented or eliminated by forward and reverse motion of the reversible drive motor 96 until microcontroller 200 measures acceptable signals from position sensor 112, force sensor 122, motor driver 202 current and movement sensor history data stored in microcontroller 200.

Figure 9:
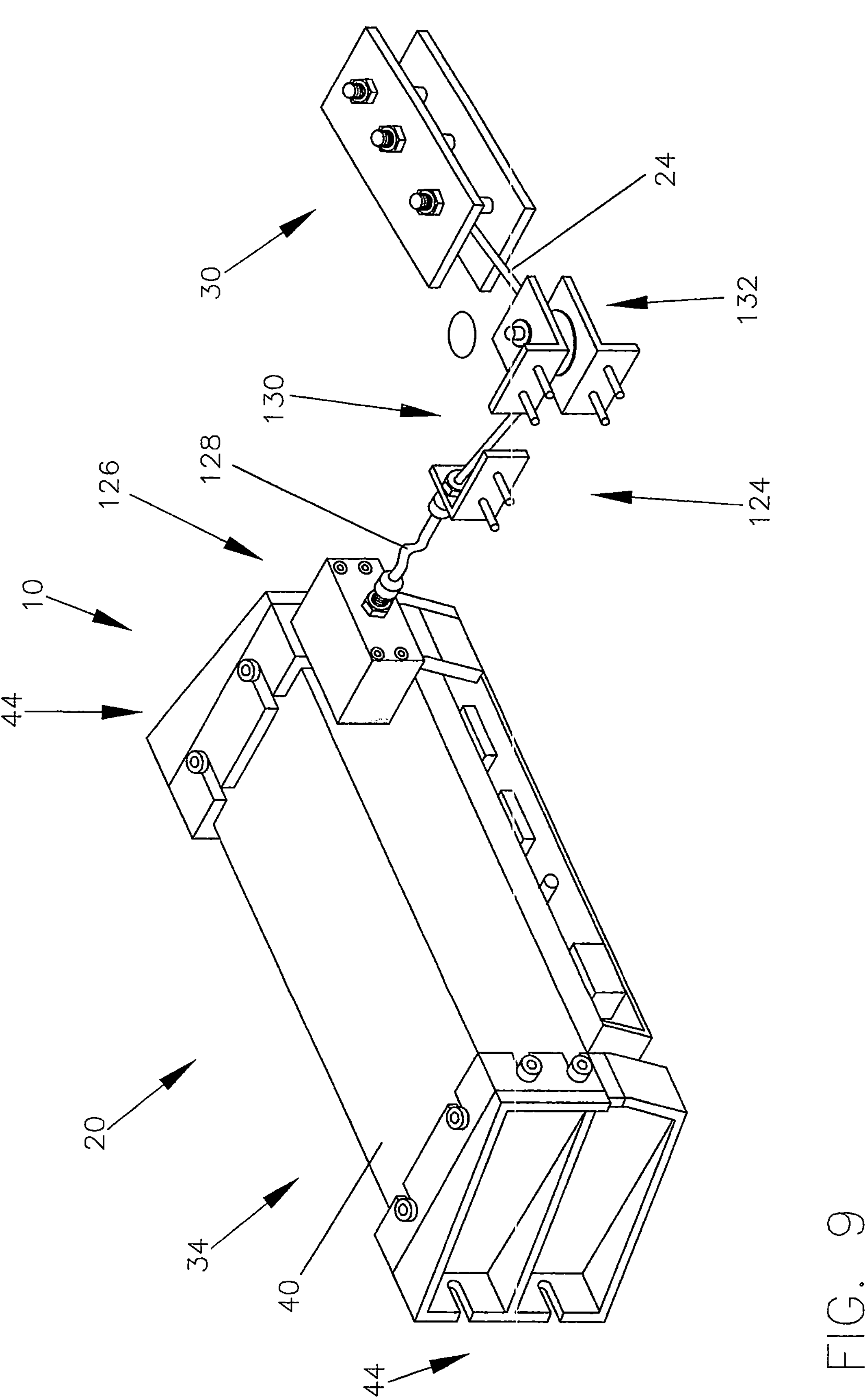
FIG. 9 is a perspective view of the cable pull assembly of the tow brake system of an alternate embodiment of the present invention.

FIG. 9 shows an adapter generally indicated as 124 coupled between the brake control assembly 20 and the brake pedal assembly connector 30 to provide an alternate mounting position in the towed vehicle 12. The adapter 124 comprises a sheath attachment generally indicated as 126 to secure a cable sheath 128 to the enclosure 34 and a cable mount generally indicated as 130 including a pulley arrangement generally indicated as 132 attached to the towed vehicle 12 to redirect the direction of the actuator cable 24 to the brake pedal connector 30.

Figure 10:
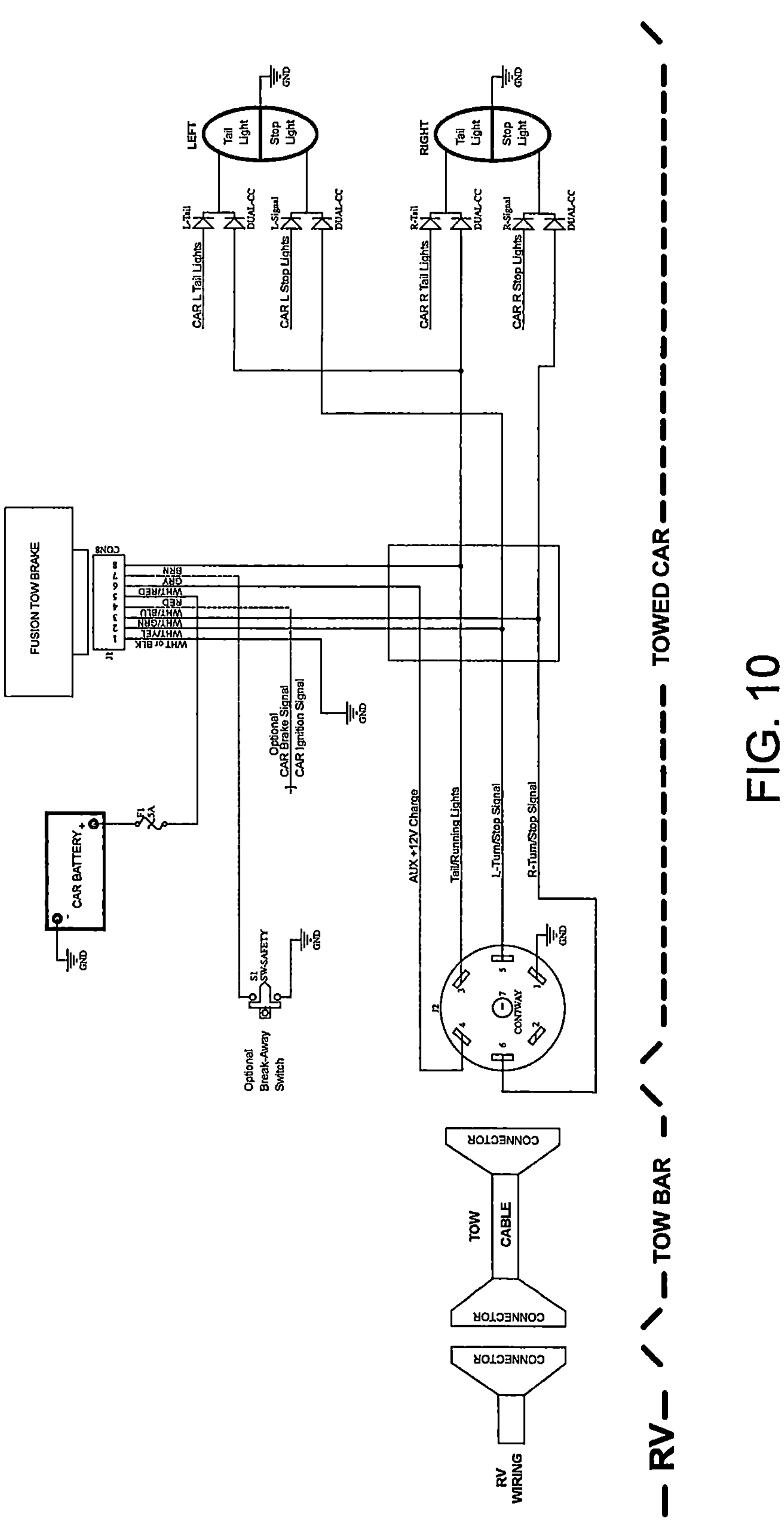
FIG. 10 is a wiring diagram between the towing vehicle and the towed vehicle of the tow brake system of the present invention.

FIG. 10 is a wiring diagram of the towed vehicle 12 coupled to the cable actuated tow brake system 10 and connected to the towing vehicle 14 by the connector harness 16.

The electronics, components and logic of the present invention depicted in FIGS. 11, 14, 16 and 17 are similar to those described in nonprovisional application Ser. No. 15/932,947 filed May 25, 2018 and incorporated hereinafter by reference.

Figure 11:
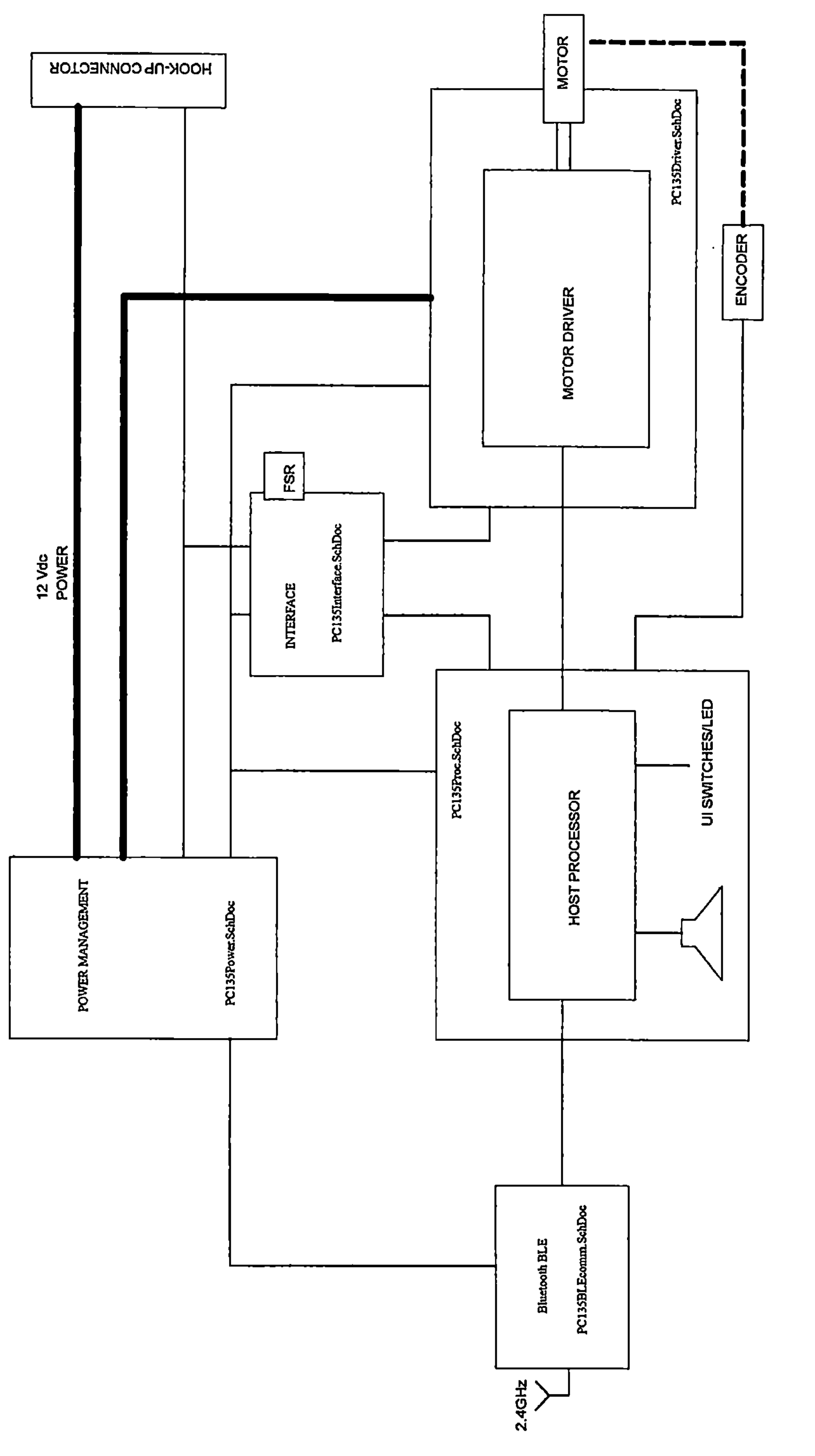
FIG. 11 is a block diagram of the tow brake system of the present invention.

FIG. 11 is a block diagram of the various circuit components of the cable actuated tow brake system 10.

Figure 12:
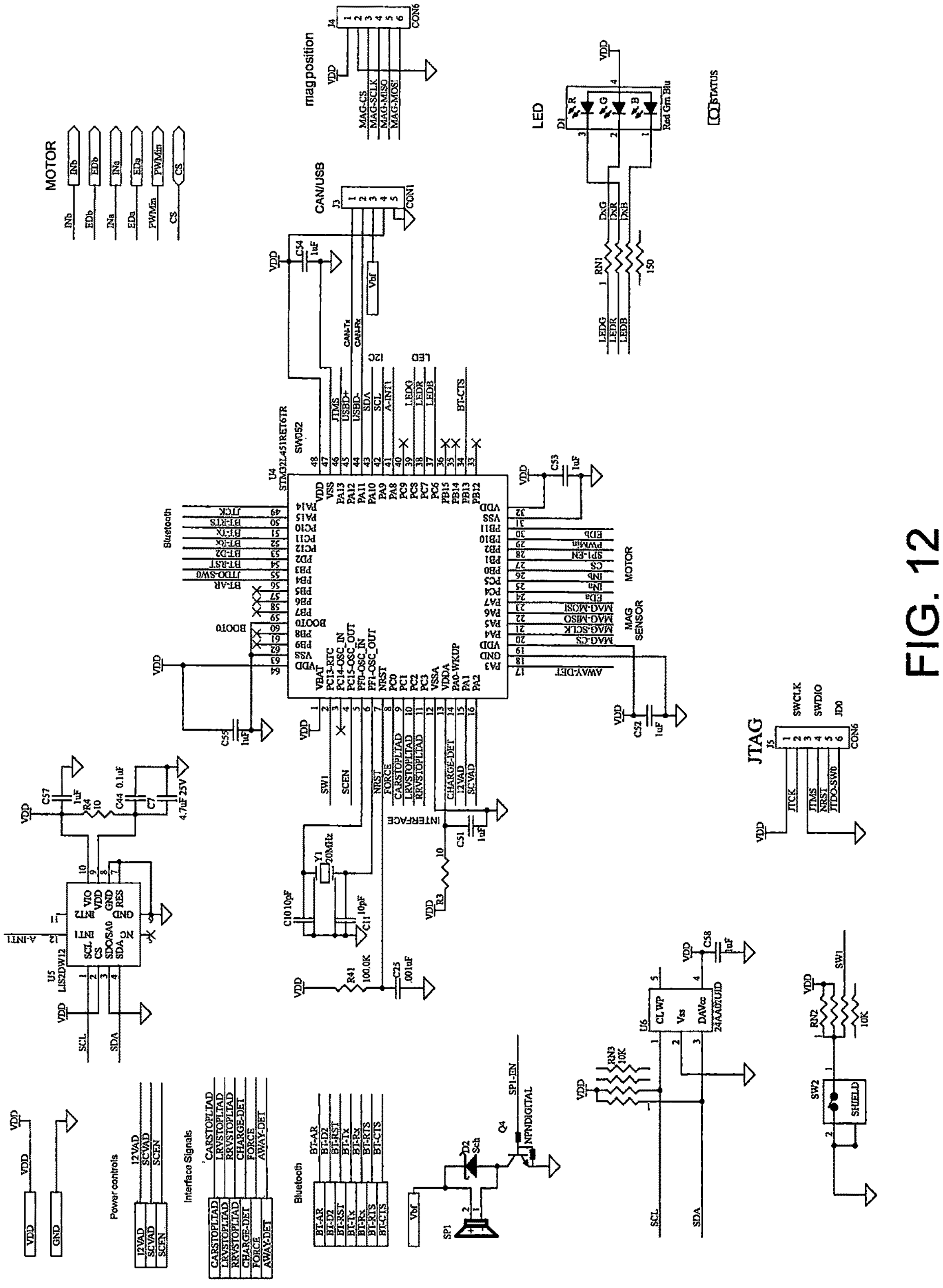
FIG. 12 is a schematic diagram of the microcontroller circuitry of the tow brake system of the present invention.

FIG. 12 is a schematic diagram of the microcontroller circuitry 201 and associated peripheral circuitry.

Figure 13:
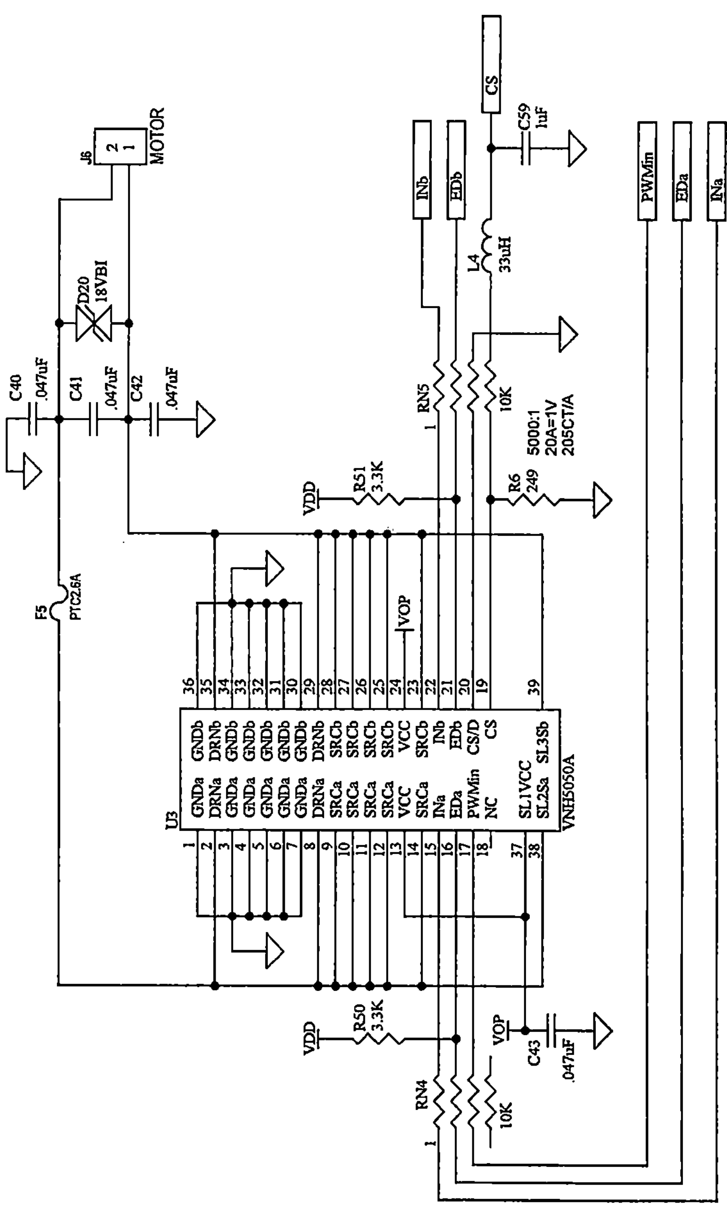
FIG. 13 is a schematic diagram of the motor drive circuitry of the tow brake system of the present invention.

FIG. 13 depicts the motor driver circuitry 203 coupled between the reversible motor 96 of the drive assembly 94 and the microcontroller 200.

Figure 14:
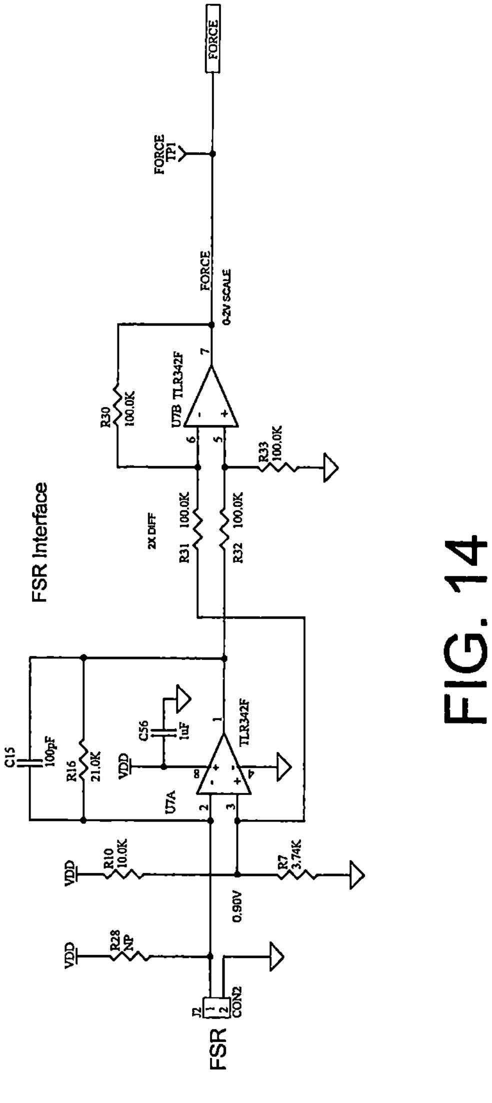
FIG. 14 is a schematic diagram of the FSR interface circuitry of the tow brake system of the present invention.

FIG. 14 is a schematic diagram of the FSR interface circuitry 205 of the interface 204 coupled between the microcontroller 200, motor driver 202, power management 206 and hook-up connector 208.

Figure 15:
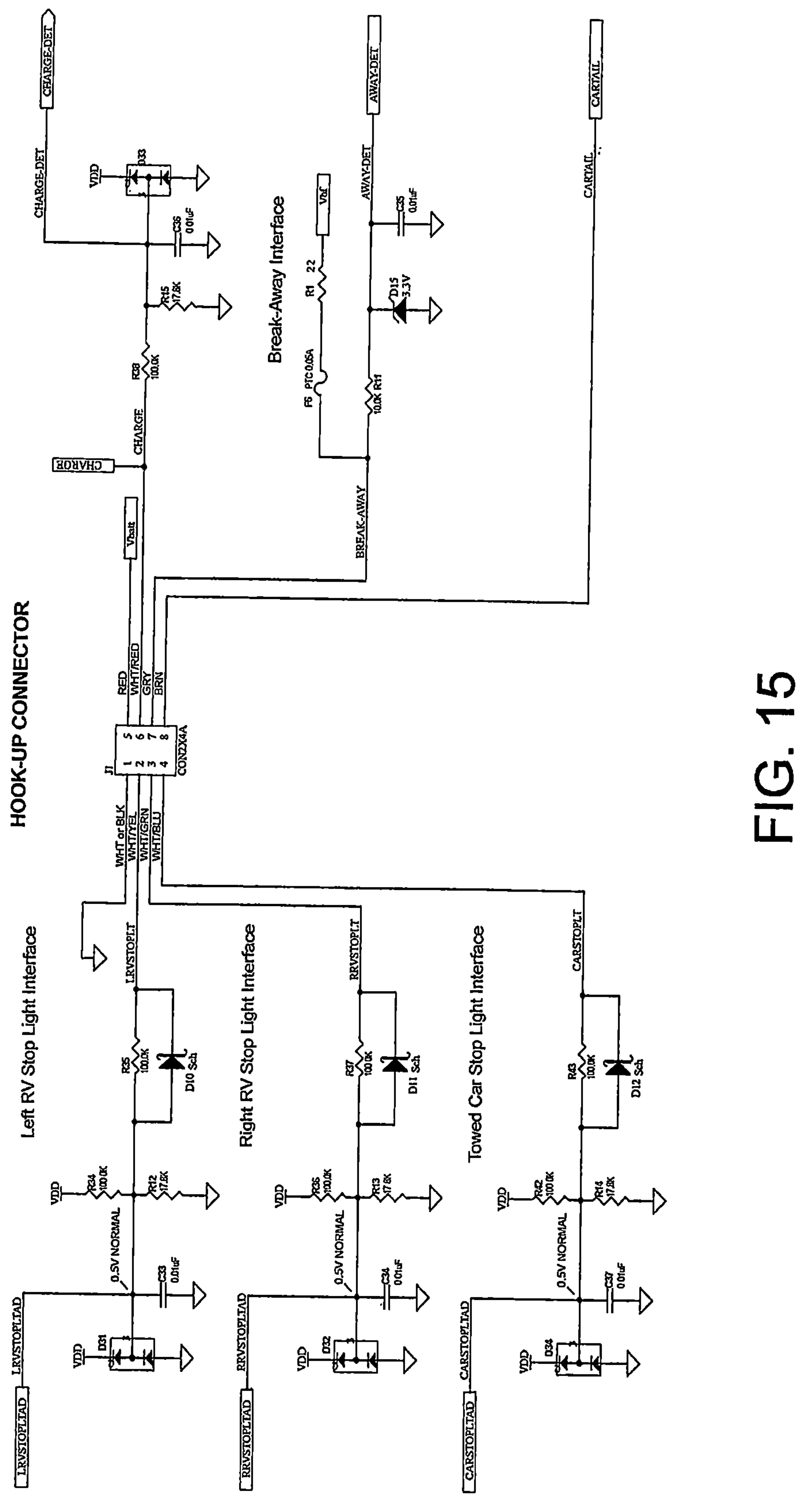
FIG. 15 is a schematic diagram of the hook-up connection circuitry of the tow brake system of the present invention.

FIG. 15 is a schematic diagram of the hook-up connector circuitry 209 connected to the power management 206. Hook-up connector 208 provides signals through interface circuitry 204 for microcontroller 200 to process various states of operation.

Figure 16:
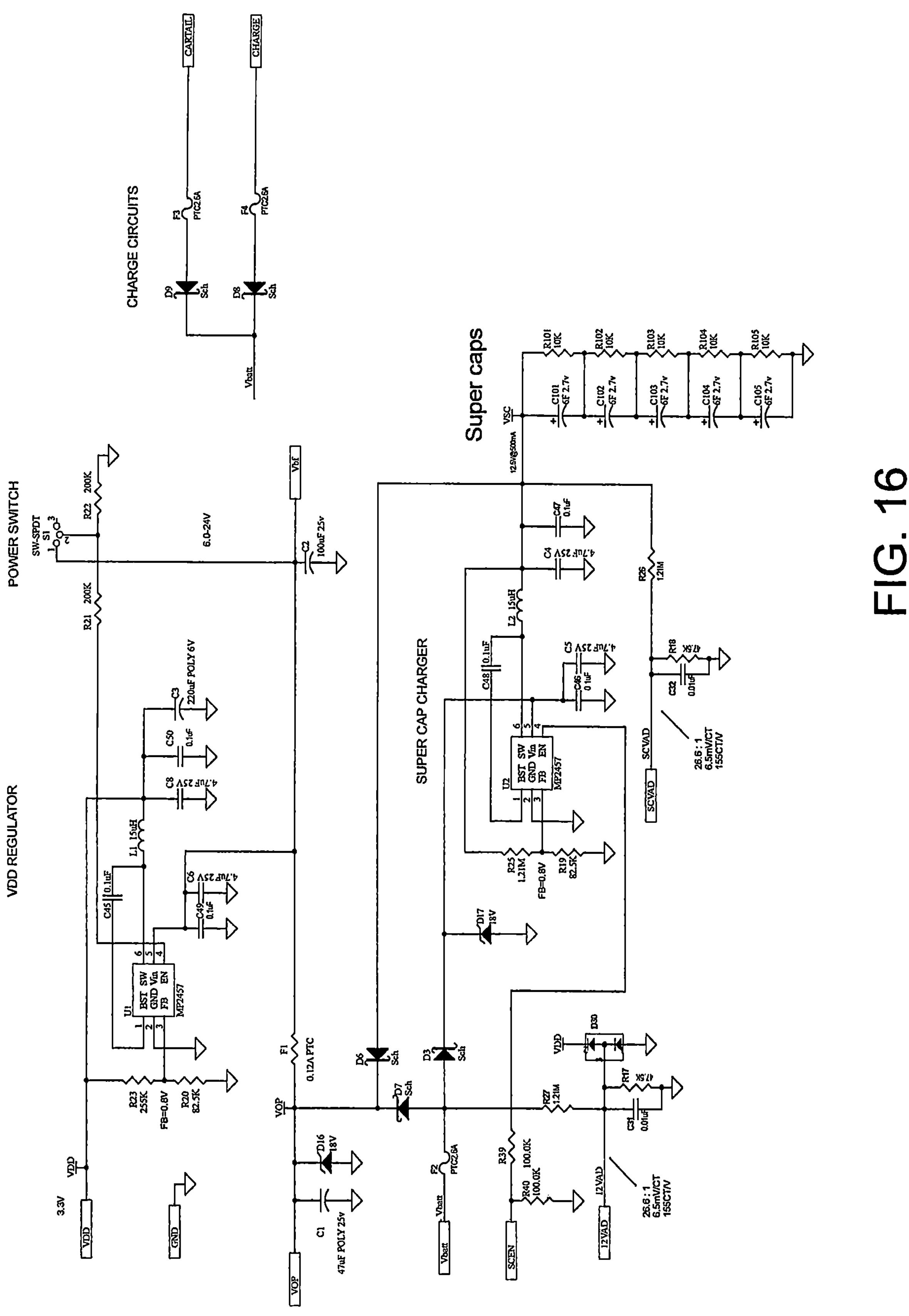
FIG. 16 is a schematic diagram of the power management circuitry of the tow brake system of the present invention.

FIG. 16 is a schematic diagram of the power management circuitry 207 coupled to the microcontroller 200, motor drive 202, interface 204, hook-up connector 208 and Bluetooth 210.

Figure 17:
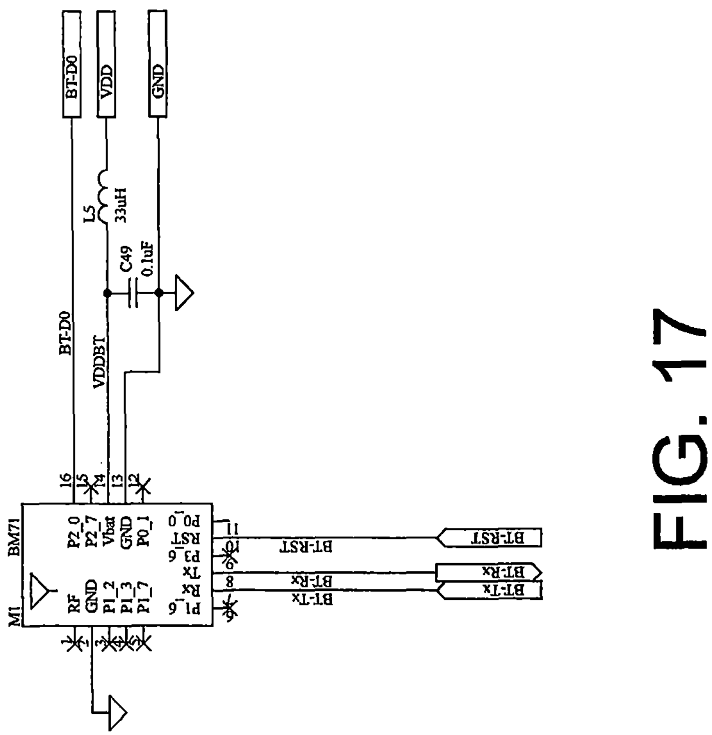
FIG. 17 is a schematic diagram of the Bluetooth circuitry of the tow brake system of the present invention.

FIG. 17 is a schematic diagram of the Bluetooth circuitry connected to the microcontroller 200 and power management 206.

Figure 18:
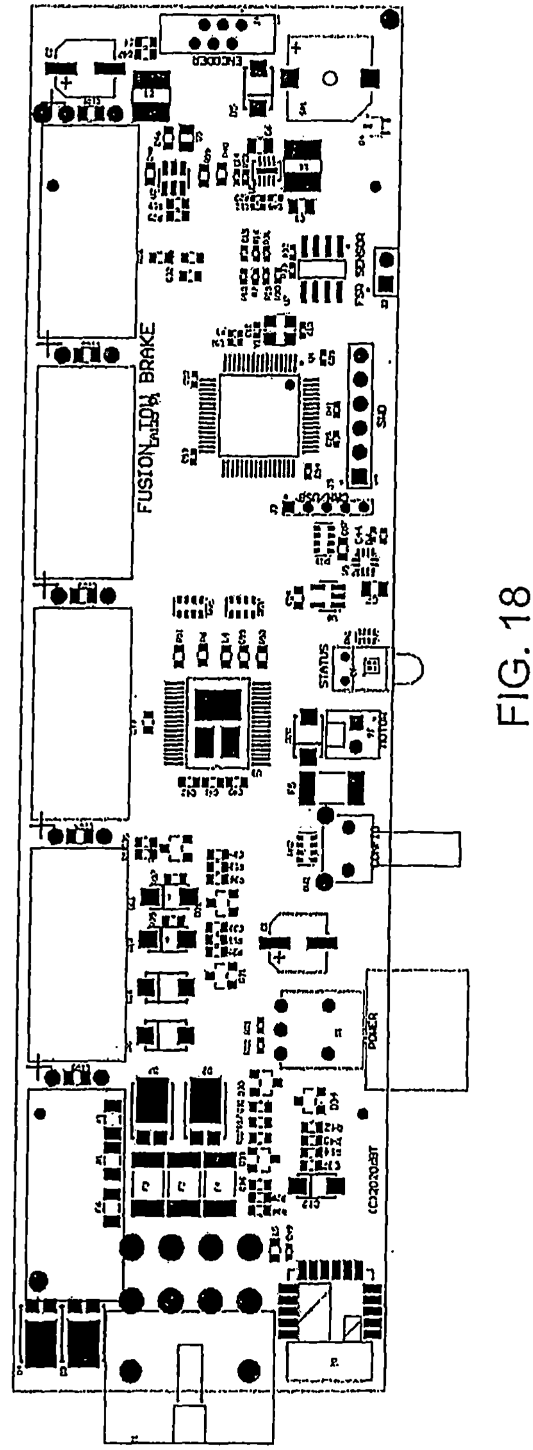
FIG. 18 is a top view of the printed circuit board of the tow brake system of the present invention.

FIG. 18 is a top view of the printed circuit board depicting the actuated circuit components implementing the electronics.

Figure 19:
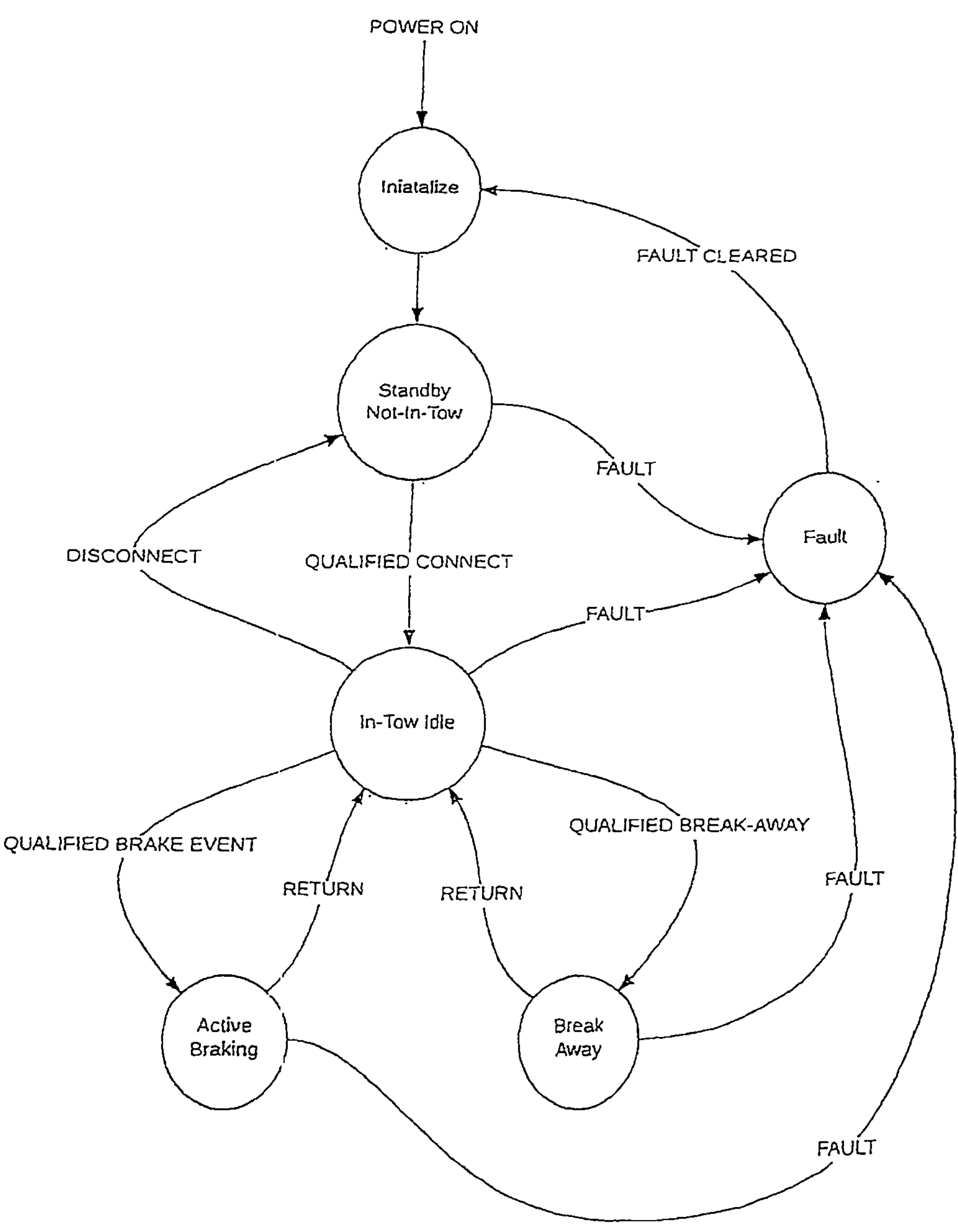
FIG. 19 is a slate diagram of the tow brake system of the present invention.

FIG. 19 is a slate diagram showing the operational status of the cable actuated tow brake system.

Figure 20:
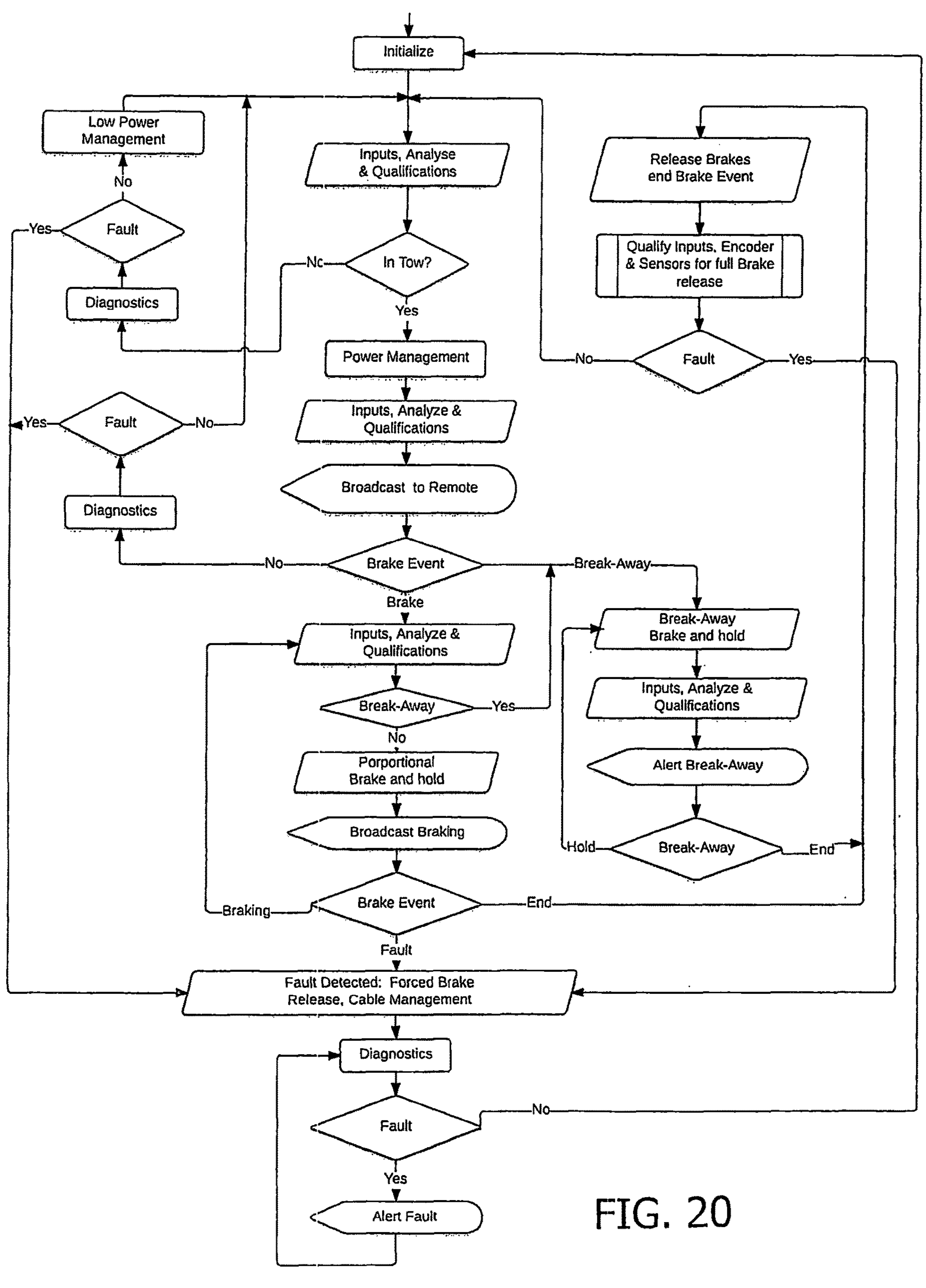
FIG. 20 is a flow chart of the tow brake system of the present invention.

FIG. 20 is a flow chart depicting the logic sequence of the cable actuated tow brake system.

A tow brake state diagram and operational tow brake flow chart of the cable actuated tow brake system are depicted in FIGS. 19 and 20 respectively.

Initialize state where the microcontroller 200 configures all inputs, outputs, initial values and conditions along with determination of type of braking system. The towed vehicle 12 braking system type is determined by retracting actuation cable 24 multiple times and measuring the profile of force sensor 122 to brake pedal assembly position sensor 112 encoder signals after sequential brake actuations. If the profile changes by more than about 10% more for per distance that the previous actuation stroke, then the brake system is determined to be of vacuum assist type. If the profile is essentially flat, then the force to distance remains constant then the brake system is determined to be of non-vacuum assist type. For example, for vacuum assist brakes the initial profile from full vacuum brake charge with the engine off, the cable travel verses cable force measurements will indicate reduced cable travel measured to cable force, for each sequential actuation, over the first few actuations. For active brakes the initial and continued profile of the cable travel verses cable force the cable travel to cable force will remain essentially constant or repeated actuations. This brake system determination result is stored in microcontroller 200 non-volatile memory and braking system type will not need to be determined again until user commanded or automatic initialization set up is performed.

Standby not-in-tow state the tow brake system 20 reduces electrical power to the lowest amount to prevent discharging the towed vehicle 12 battery. Only in-tow detection circuitry is powered and processed by microcontroller 200 to qualify connection to a towing RV or other towing vehicle 14. Diagnostics are performed by microcontroller 200, upon fault detection the brake system 20 performs fault mitigation and notifications.

Diagnostics are processed by microcontroller 200 to determine proper and safe operation of the tow brake system 10. Diagnostic functions included computer-operating-properly timer or watch-dog timer time-out allowable combinations of inputs and outputs including towed vehicle 12 stop light signal on when tow brake system 20 is not braking or actuated, sensor measurements in acceptable ranges, sequence time outs, predetermined rules, combinational and state variables or any other items effecting the normal and safe operation of cable actuated tow brake system 10.

Qualified in-tow connection of towed vehicle 12 coupled to towing RV or other towing vehicle 14 is determined by brake system 20 microcontroller 200 processing multiple signals of hook-up connector 208 signals, internal interface signals 204 and microcontroller memory over predetermined periods of time.

In-tow idle state entered by qualified in-tow connection, the tow brake system 20 powers up and processes interface circuitry 204 and MEMs acceleration sensor with microcontroller 200 to determine and qualify a supplemental braking event or a disconnection. Automatic vacuum assist brake vacuum reservoir of towed vehicle 12 vacuum may be depleted or managed if microcontroller 200 non-volatile memory has a setting of vacuum assist brake system type. Status information is broadcasted to the control and display console 18 in the RV or towing vehicle 14. Diagnostics are performed by microcontroller 200, upon fault detection the brake system 10 performs reconfiguration and restores volatile memory.

Braking events are determined by the brake system 20 when the microcontroller 200 selectively processes any combinations of multiple signals including control and display console 18 command, hook-up connector 208 signals, interface signals 204, MEMs accelerometer, microcontroller 200 memory variables along with timing requirements over predetermined periods of time to qualify braking event. Hook-up connector 208 signals used to determine braking events may include simultaneous left and right turn/brake light signals, loss of charge line signal or a brake control signal from a remote brake controller (not shown). Interface 204 signals used to determine braking event may include break-away signal. MEMs acceleration sensor may be used solely or in conjunction with other signals to qualify a braking event.

Braking event state entered by qualified brake event detection by microcontroller 200 repeatedly analyzes multiple signals including control and display console 18 command, hook-up connector 208 signals, interface signals 204, MEMs accelerometer, microcontroller memory variables and timing to perform proportional braking or exit active braking state to diagnostic fault, break-away or end of braking event. During active braking events microcontroller 200 generates proportional brake signals proportional to brake towed vehicle 12 to acceleration generated by towing RV or other towing vehicle 14 based on the multiple signals including the MEMS acceleration sensor on PCB 106. Microcontroller 200 sequences through multiple braking event phases to provide; a brake pull phase that pulls cable 24 with the drive assembly 94 to produce a pull force proportion to MEMS acceleration sensor signal and measured by the force sensor 122, a brake hold phase reduces the average drive current to drive motor 96 using PWM to save power and reduce heat, a brake force adjustment phase to proportionally to reduce or increase pull force if MEMS acceleration sensor signal or manual braking command from control and display console 18 command changes by a predetermined amount. Status information is indicated on unit 20 and broadcasted to the control and display console 18 in the RV or towing vehicle 14.

Break-away event state entered by break-away detection using a break away switch located by tow bar connector harness 16 connected to hook-up connector 208 or a generated signal by microcontroller 200 detecting a loss of the charging connection in connector harness 16. Microcontroller 200 sequence through multiple break-away phases to provide; a brake pull phase pulls cable 24 with the drive assembly 94 to produce a pull force to a predetermined force stored in non-volatile memory, a brake hold phase reduces the average drive current to a set level to drive motor 96 using PWM to save power and reduce heat. Break-away event notifications are alerted and indicated on brake unit 20 and broadcasted to the control and display console 18.

Brake releases are performed upon exiting brake events or exiting break-away events or detection of faults or loss of towed vehicle battery power. Microcontroller 200 generates a signal to drive the reversible motor 96 to spool cable 34 to return the brake pedal assembly 28 to its unactuated position. Microcontroller 200 processes signals from encoder 116 and force sensor 122 to determine how much cable 34 to spool out. Diagnostics are performed by microcontroller 200 processing signals from signals including the encoder 116, force sensor 122, motor drive current sensor in 202, timing to assure brake pedal assembly 28 is returned to its unactuated position, otherwise perform Fault detected cable management.

Fault detection signals microcontroller 200 to perform a sequence of cable management, reinitialization of microcontroller 200 and user indication on brake unit 10 as well as with control and display console 18. The sequence of fault cable management begins with spooling out actuator cable 24 to brake pedal assembly 28, if brake sensors that may include towed vehicle 12 brake light signal indicates brake pedal assembly 28 is actuated then binding faults are remedied. If binding faults fail to remedy, then notifications are alerted and indicated on brake unit 10 and broadcasted to the control and display console 18.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

In describing the invention, certain terms are used for brevity, clarity, and understanding. No unnecessary limitations should be inferred beyond the requirement of the prior art because such terms are used for descriptive purposes and are intended to be broadly construed. The different structural and functional elements, apparatuses, devices, compositions, and methods described herein may be used alone or in combination with other structural and functional elements, apparatuses, devices, compositions, systems, and methods. It is to be expected that various equivalents, alternatives, and modifications are possible within the scope of the various description.

What is claimed:

1. A cable actuated tow brake system to control the braking of a towed vehicle comprising an actuator cable coupled to a pulley disposed within a brake control assembly and the brake pedal assembly of the towed vehicle, said pulley operatively coupled to a drive motor to rotate said pulley to selectively displace the brake pedal of the towed vehicle to apply the brakes of the towed vehicle proportionally to the braking of the towing vehicle when the brakes of the towing vehicle are applied, said brake control assembly comprises an enclosure secured to the towed vehicle and including a front wall, rear wall, top wall and bottom wall to house said pulley and said drive motor and further including a cable guide including a cable opening formed in said front wall of said enclosure and having a pair of substantially parallel rollers forming a slot or opening therebetween to receive said actuator cable therethrough.

2. The cable actuated tow brake system of claim 1 wherein said rollers are rotatably mounted to said front wall of said enclosure by a mounting bracket secured to said front wall of said enclosure.

3. The cable actuated tow brake system of claim 1 wherein said actuator cable is coupled to the brake pedal assembly of the vehicle by a brake pedal assembly connector comprising a pair of substantially parallel members disposed in spaced relationship to each other having a proximal attachment member extending between a proximal end portion of each said substantially parallel member to attach a distal end portion of said actuator cable to said brake pedal assembly connector.

4. The cable actuated tow brake system of claim 3 further including a pair of substantially parallel brake pedal arm connector members disposed in spaced relationship relative to each other extending between said substantially parallel members to cooperatively form an opening therebetween to retain the brake pedal arm of the brake pedal assembly therein to couple said actuator cable to the brake pedal assembly.

5. The cable actuated tow brake system of claim 1 further including a pair of substantially parallel brake pedal arm connector members disposed in spaced relationship relative to each other extending between said substantially parallel members to cooperatively form an opening therebetween to retain the brake pedal arm of the brake pedal assembly therein to couple said actuator cable to the brake pedal assembly.

6. The cable actuated tow brake system of claim 1 wherein a proximal end of said actuator cable including a diameter is coupled to said pulley disposed within a pulley block cavity including a diameter formed in a pulley block disposed within said enclosure.

7. The cable actuated tow brake system of claim 6 wherein a groove is formed in the circumference of said pulley to receive a proximal portion of said actuator cable, said groove having a depth equal to or less than twice said diameter of said actuator cable.

8. The cable actuated tow brake system of claim 7 wherein the depth of said groove is equal to or less than twice said diameter of said actuator cable to prevent said actuator cable from crossing over itself to prevent binding.

9. The cable actuated tow brake system of claim 6 wherein the depth of said groove is equal to or less than two diameters of said actual cable to prevent said actuator cable from crossing over itself in said groove.

10. The cable actuated tow brake system of claim 1 wherein a drive motor selectively rotates said pulley to increase or decrease the tension between said actuator cable and the brake pedal assembly to control braking of the towed vehicle.

11. The cable actuated tow brake system of claim 10 wherein said drive motor comprises a reversible drive motor connected to output shaft to selectively wind said actuator cable onto said pulley to actuate the brake pedal assembly of the towed vehicle to actuate the tow vehicle brakes or to unwind said actuator cable on said pulley to release the brakes of the towed vehicle.

12. The cable actuated tow brake system of claim 11 wherein drive motor is free to move within said brake control assembly allowing said drive motor to exert essentially the same magnitude of force as applied to the brake pedal arm on a force sensor disposed within said enclosure.

13. The cable actuated tow brake system of claim 12 wherein said force sensor is normally biased in to prevent a force from being applied in the absence of a braking event.

14. The cable actuated tow brake system of claim 11 further including a brake pedal position sensor and a microprocessor, said brake pedal position sensor disposed adjacent said output shaft to sense the rotational position of said pulley relative to the non-braking position of said pulley when there is no tension on said actuator cable and the brake pedal assembly is not displaced and to generate a signal as an indication of the amount of said actuator cable is taken-up on said pulley fed to said microcontroller.

15. The cable actuated tow brake assembly of claim 14 wherein said brake pedal assembly position sensor comprises an encoder coupled to said pulley mount to support an encoder assembly including an encoder and encoder printed circuit board that in combination with a magnet mounted to said output shaft generates said signal corresponding to the angle of said output shaft relative to the position of said encoder and when said pulley is in position that the tension of said actuator cable is not actuating the brakes of the towed vehicle.

16. The cable actuated tow brake assembly of claim 15 wherein said encoder is disposed coaxially relative to said output shaft and said magnet to sense the position or angle of said output shaft angle relative to said encoder printed circuit board.

17. The cable actuated tow brake assembly of claim 15 wherein a force sensor located on said encoder printed circuit board and an acceleration sensor together generate signals fed to said microcontroller to generate proportional brake signals to brake towed vehicle of acceleration generated by towing vehicle.

18. The cable actuated tow brake system of claim 1 wherein said microcontroller reverses operation of said reversible motor to apply tension to said actuator cable when the force applied to the brake pedal assembly is reduced to correlate to the predetermined current of the motor current.

19. A cable actuated tow brake system to control the braking of a towed vehicle comprising an actuator cable coupled to a pulley disposed within a brake control assembly and the brake pedal assembly of the towed vehicle, said pulley operatively coupled to a drive motor to rotate said pulley to selectively displace the brake pedal of the towed vehicle to apply the brakes of the towed vehicle proportionally to the braking of the towing vehicle when the brakes of the towing vehicle are applied wherein a proximal end of said actuator cable including a diameter coupled to said pulley is disposed within a pulley block cavity wherein a groove is formed in a circumference of said pulley to receive a proximal portion of said actuator cable, said groove having a depth equal to or less than twice said diameter of said actuator cable.

20. The actuator tow brake system of claim 19 wherein the depth of said groove is equal to or less than twice the diameter of said actuator cable and wherein the depth of said groove is equal to or less than twice the diameter of said actuator cable to prevent said actuator cable from crossing over itself to prevent binding.

21. A cable actuated tow brake system to control the braking of a towed vehicle comprising an actuator cable coupled to a pulley disposed within a brake control assembly and the brake pedal assembly of the towed vehicle, said pulley operatively coupled to a drive motor to rotate said pulley to selectively displace the brake pedal of the towed vehicle to apply the brakes of the towed vehicle proportionally to the braking of the towing vehicle when the brakes of the towing vehicle are applied wherein a proximal end of said actuator cable including a diameter is coupled to said pulley disposed within a pulley block cavity and a groove formed in a circumference of said pulley having a depth equal to or less than two diameters of said actual actuator cable to prevent said actuator cable from crossing over itself in said groove.

22. A cable actuated tow brake system to control the braking of a towed vehicle comprising an actuator cable coupled between a pulley disposed within an enclosure and a brake pedal assembly of the towed vehicle, said pulley is operatively coupled to a reversible drive motor to increase tension on said actuator cable to displace a brake pedal of the brake pedal assembly of the towed vehicle to apply the brakes of the towed vehicle proportionally to the braking of a towing vehicle when the brakes of the towing vehicle are applied and to decrease tension on said actuator cable to release the brakes of the towed vehicle when the towing vehicle is not braking, said reversible drive motor is movably disposed within said enclosure to selectively engage a force sensor when tension is applied to said actuator cable displacing the brake pedal and a microcontroller coupled to said reversible drive motor to control the operation of said reversible drive motor, said microcontroller includes logic to compare a sensor signal generated by said force sensor proportional to the force applied to the brake pedal assembly by said actuator cable when the brakes of the towing vehicle are applied and the current motor operating said reversible motor and to generate a signal to reverse operation of said reversible motor when the motor current exceeds the preestablished motor current correlating with the force applied to said actuator cable to reduce tension on said actuator cable.

23. The cable actuated tow brake system of claim 22 further including a brake pedal assembly position sensor to sense the rotational position of said pulley and to generate a pulley signal to indicate the amount of said actuator cable taken-up on said pulley, said pulley signal fed to said microcontroller including logic to compare said pulley signal with the motor current operating the reversible motor when the brakes of the towing vehicle are applied and to generate a signal to reverse operation of said reversible motor when the brakes of the towing vehicle are applied and to generate a signal to reverse operation of said reversible motor when the motor current exceeds the motor current preestablished correlation with said pulley signal to reduce tension on said actuator cable.

24. The cable actuator tow brake system of claim 23 wherein said microcontroller reverses said reversible motor to apply tension to said actuator cable when the rotational position of said pulley and the motor current reach the pre-established correlation.

25. A cable actuated tow brake system to control the braking of a towed vehicle comprising an actuator cable coupled between a pulley disposed within an enclosure and a brake pedal assembly of the towed vehicle, said pulley is operatively coupled to a reversible drive motor to increase tension on said actuator cable to displace a brake pedal of the brake pedal assembly of the towed vehicle to apply the brakes of the towed vehicle proportionally to the braking of a towing vehicle when the brakes of the towing vehicle are applied and to decrease tension on said actuator cable to release the brakes of the towed vehicle when the towing vehicle is not braking, said reversible drive motor is movably disposed within said enclosure to selectively engage a force sensor when tension is applied to said actuator cable displacing the brake pedal and further including a brake pedal assembly position sensor to sense the rotational position of said pulley and generate a pulley signal indicative of the amount of said actuator cable taken-up on said pulley and to generate a signal indicative of the amount of the said actuator cable taken-up on said pulley and a microcontroller coupled to said reversible drive motor to control the operation of said reversible drive motor, said microcontroller includes logic to correlate a force sensor signal sensed by said force sensor proportional to the force applied to the brake pedal assembly by said actuator cable when the brakes of the towing vehicle are applied and the pulley signal indicative of the rotation position of said pulley and to generate a signal to reverse operation of said reversible motor when the force sensor signal exceeds the correlation with the force applied to said actuator cable to reduce tension on said actuator cable.

26. The cable actuator for brake systems of claim 25 wherein said microcontroller reverses operation of said reversible motor to apply tension to said actuator cable when the rotational position of said pulley and the force applied to the brake pedal assembly is reduced to correlate with the preestablished correlation.

* * * * *